United States Patent [19]

Carangelo et al.

[11] Patent Number: 5,136,154
[45] Date of Patent: Aug. 4, 1992

[54] METHOD AND SYSTEM FOR PHOTOCONDUCTIVE DETECTOR SIGNAL CORRECTION

[75] Inventors: Robert M. Carangelo, Glastonbury; David G. Hamblen, East Hampton; Carl R. Brouillette, West Hartford, all of Conn.

[73] Assignee: Advanced Fuel Research, Inc., East Hartford, Conn.

[21] Appl. No.: 698,263

[22] Filed: May 10, 1991

[51] Int. Cl.⁵ .................................. H01J 40/14
[52] U.S. Cl. ......................... 250/214 L; 250/214 C
[58] Field of Search ........... 250/214 L, 214 C, 214 R; 307/311

[56] References Cited

U.S. PATENT DOCUMENTS

| | | | |
|---|---|---|---|
| 3,582,659 | 6/1971 | Dekker | 250/214 L |
| 3,952,205 | 4/1976 | Tobey, Jr. et al. | 250/214 L |
| 4,927,269 | 5/1990 | Keens et al. | 356/346 |
| 4,944,589 | 7/1990 | Nordquist | 356/326 |

OTHER PUBLICATIONS

"Correcting for Nonlinearity in a Photodetector" by NASA's Jet Propulsion Laboratory, Pasadena, Calif.-26 week of 1988.

Primary Examiner—David C. Nelms
Assistant Examiner—K. Shami
Attorney, Agent, or Firm—Ira S. Dorman

[57] ABSTRACT

A corrective factor is applied so as to remove anomalous features from the signal generated by a photoconductive detector, and to thereby render the output signal highly linear with respect to the energy of incident, time-varying radiation. The corrective factor may be applied through the use of either digital electronic data processing means or analog circuitry, or through a combination of those effects.

27 Claims, 4 Drawing Sheets

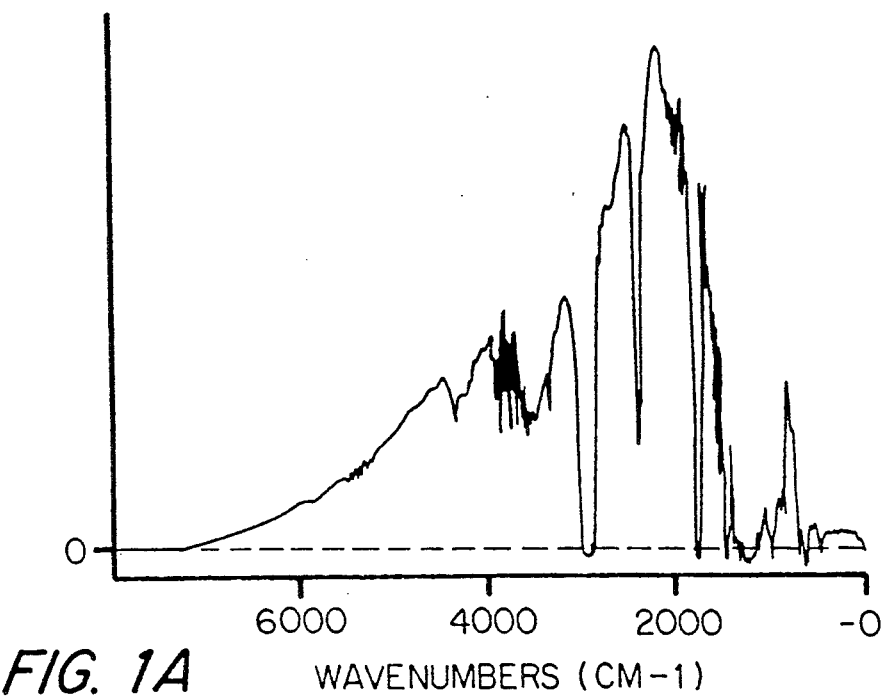
FIG. 1A    WAVENUMBERS (CM-1)
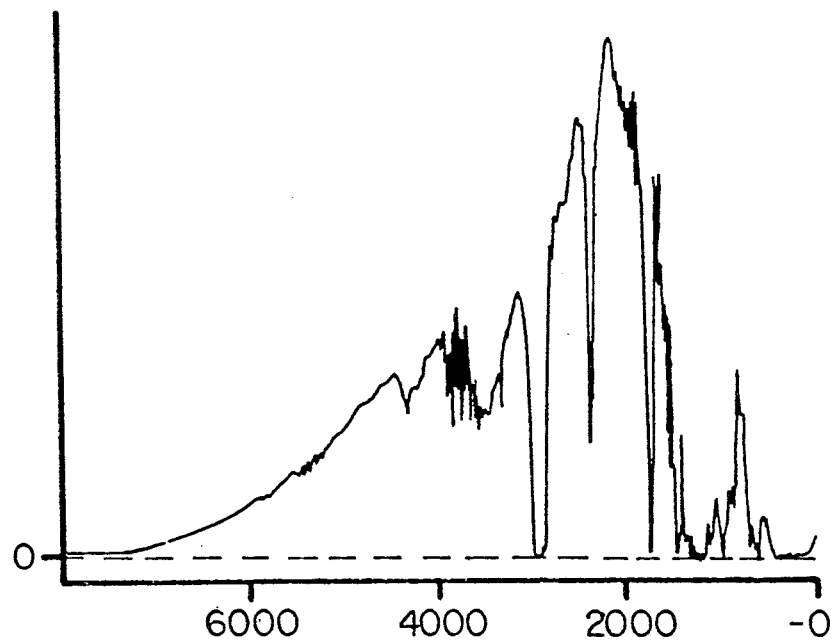
FIG. 1B    WAVENUMBERS (CM-1)

METHOD AND SYSTEM FOR PHOTOCONDUCTIVE DETECTOR SIGNAL CORRECTION

The United States Government has rights in this invention pursuant to Contract No. DE-AC01-88ER80561, awarded by the Department of Energy.

BACKGROUND OF THE INVENTION

It is well known that inaccuracies are often introduced in spectrometric analyses by the photoconductive detectors employed, due to nonlinearity between the electrical signal generated and the energy, of the incident radiation. A method and apparatus for correcting such nonlinearity are disclosed in Keens et al U.S. Pat. No. 4,927,269, issued May 22, 1990. Because it is predicated upon a series of somewhat arbitrary assumptions, however, the technique described by Keens et al is believed to be of only limited utility and value.

Accordingly, it is the broad object of the present invention to provide a highly effective, and yet incomplex, method and system for correcting the electrical signals that are generated by photoconductive detectors, so as to render the output signal substantially linear with respect to the energy of incident radiation.

A more specific object of the invention is to provide such a method and system, which utilize and implement physical principles that underlie photoconductive detector response phenomena.

Another specific object is to provide such a system in which is incorporated a novel analog circuit for linearizing the photoconductive detector signal.

Related objects of the invention are to provide such a method which is facile to utilize, and to provide such a system which is relatively inexpensive to produce.

SUMMARY OF THE INVENTION

It has now been found that certain of the foregoing and related objects of the invention are attained by the provision of a method in which a photoconductive detector, to which is applied a constant bias voltage, is used to generate an electrical signal having a time-varying value $X_s$, the value $X_s$ being indicative of the energy of electromagnetic radiation incident upon the detector but including electrical distortions which render it nonlinearly related thereto. A corrective signal is produced having the value $(X_s - C)^2$, at least a fraction of which is added to a signal having at least the value $X_s$ so as to substantially eliminate the electrical distortions and thereby produce a linearized output signal. Depending upon the nature of the signal $X_s$, the term "C" may be either zero or a numeric value with the same units as $X_s$; it will be zero when $X_s$ is the A.C. portion of a modulated signal, such as an interferogram, and it will be a reference voltage value when the signal value $X_s$ constitutes detector output voltage.

The generated and corrective signals will generally be combined in accordance with the relationship:

$$1/a \times (X_s + f[X_s - C]^2),$$

wherein "f" is a fractional constant and "a" has a value of either unity (when $X_s$ is detector output voltage), or of "f" (when $X_s$ is the A.C. portion of a modulated signal). In carrying out the method, a specific value "$f_0$" of the constant "f" is established at which, in the combined signal, the electrical distortions are substantially eliminated.

Other objects of the invention are attained by the provision of a system that includes a photoconductive detector, as hereinabove described, a "constant bias voltage" bias circuit connected to the detector, means for producing a corrective signal $(X_s - C)^2$, and means for adding at least a fraction of the corrective signal to a signal having at least the value $X_s$. The generated and corrective signals will generally be combined in accordance with the above-stated relationship, and the system will generally include means for establishing the value of "$f_0$."

In certain embodiments of the system, the means for producing, the means for adding, and the means for establishing will comprise an analog electronic circuit connected to operate upon the detector signal voltages, in which case the combining relationship will be: $X_s + f(X_s - C)^2$. The means for establishing "$f_0$" in such a system will advantageously comprise a variable voltage divider; the adding means of the system, and the means for producing the value $(X_s - C)^2$, will preferably comprise an integrated circuit to which the voltage divider is operatively connected.

In other embodiments of the system, the means for producing, the means for adding, and/or the means for establishing "$f_0$" will comprise electronic data processing means, in which case the combining relationship will be $X_s/f + (X_s)^2$ and the detector signal will be in the form of the A.C. portion of a modulated signal. The system will, in any event, generally include a source of electromagnetic radiation, operatively disposed to project a beam upon the detector, and it will most desirably comprise a Fourier transform infrared spectrometer (FT-IR).

BRIEF DESCRIPTION OF THE DRAWINGS

FIGS. 1A and 1B are spectrometer traces showing, respectively, the Fourier transform spectrum of an uncorrected photoconductive detector-generated signal, and a like spectrum of the same signal subjected to linearization in accordance with the present invention;

DETAILED DESCRIPTION OF THE PREFERRED AND ILLUSTRATED EMBODIMENTS

Turning initially to FIGS. 1A and 1B of the appended drawings, therein illustrated are curves of signals that have been Fourier processed to produce a single beam spectrum (in the curves, the abscissa is, as indicated, in wavenumber increments; the ordinate units are arbitrary). The signal used for the transformation was an interferogram taken on a Bomem Michelson model 110 (FT-IR) spectrometer, in which was employed a mercury cadmium telluride detector having a cutoff, frequency at 430 cm$^{-1}$ (i.e., being nonresponsive to radiation at lower frequencies). A commercial plastic wrap was folded to provide ten plies, and the resulting structure was held in the path of the beam from the interferometer.

FIG. 1A depicts the uncorrected signal. FIG. 1B illustrates the same signal, linearized in accordance with the present invention. As can be seen, many of the absorption features from the plastic wrap are shown in the uncorrected signal curve to dip below the zero level; this is of course an erroneous representation. In addition, the curve shows a positive signal below 430 cm$^{-1}$; i.e., at frequencies less than the detector cutoff frequency, which is of course also a false value. The curve of FIG. 1B, corrected in accordance with the instant linearization methodology, indicates that the foregoing anomalies have been eliminated.

Figure 2:
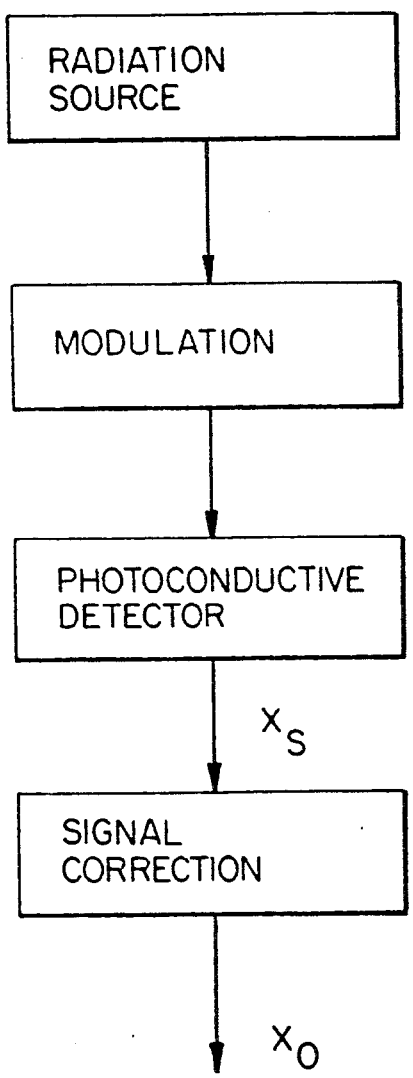
FIG. 2 is a schematic diagram of a system embodying the present invention.
Figure 3:
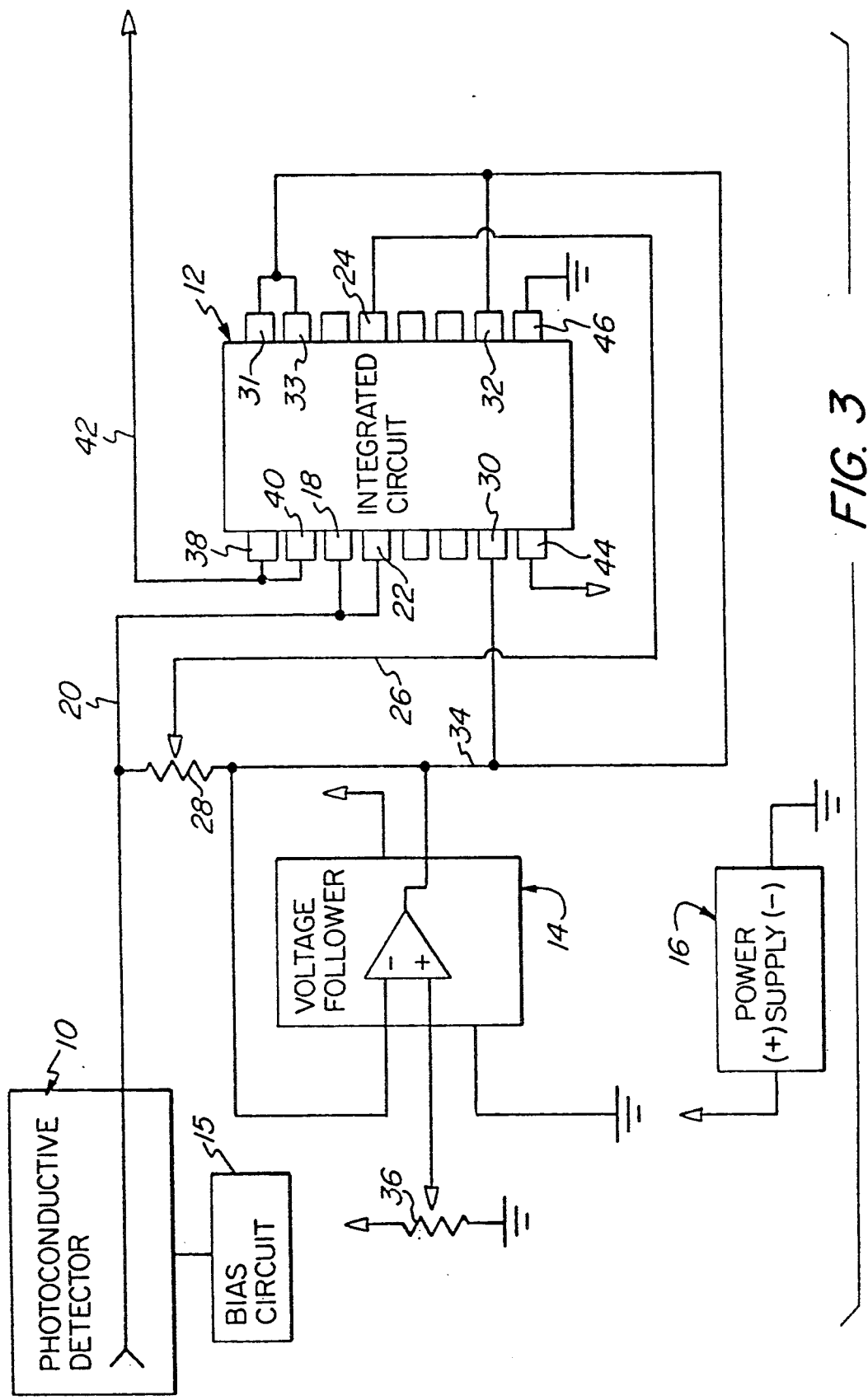
FIG. 3 is a schematic diagram illustrating an analog electronic circuit suitable for use in the system of the invention.
Figure 4:
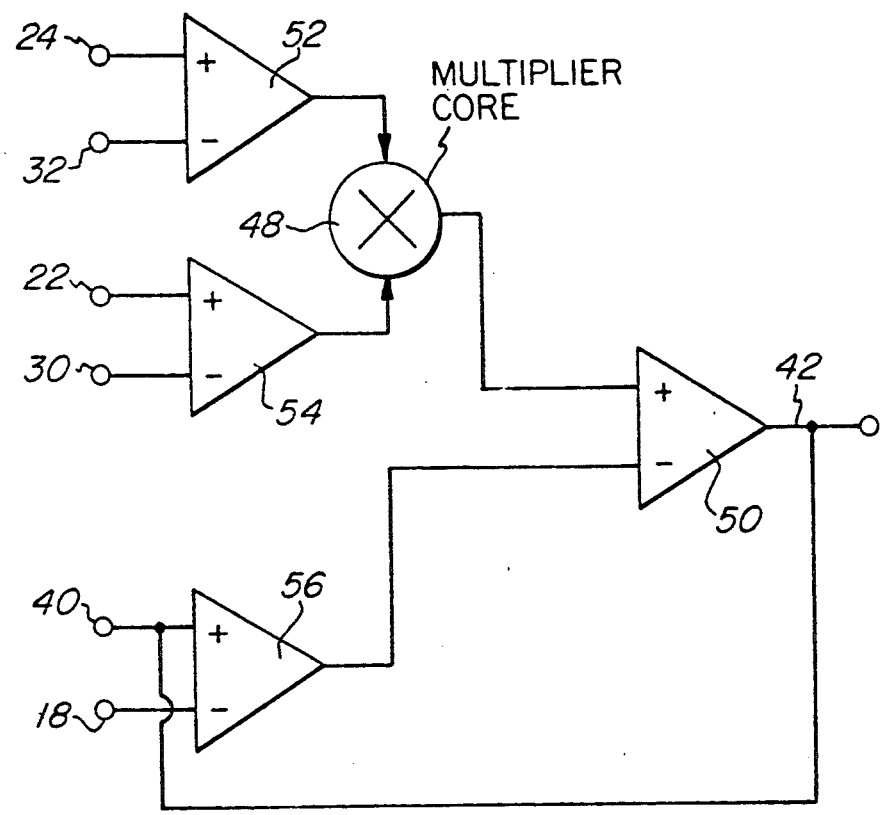
FIG. 4 is a schematic diagram showing functional features of the semiconductor chip utilized in the circuit of FIG. 3.

The system of the invention, schematically illustrated in FIG. 2, comprises a radiation source that produces a beam, which passes (by means of suitable transfer optics) through modulating means to a photoconductive detector. The electrical signal $X_s$ generated by the detector is processed by linearizing means, so as to produce an output signal $X_o$ which bears a substantially linear, distortion-free relationship to the time-varying value of radiant energy originating at the source. It will be appreciated that the modulating means may be the interferometer of an FT-IR spectrometer, and that the radiation source and linearizing means may be the IR source (e.g. globar) and computer thereof, respectively. It will also be appreciated that the source may generate electromagnetic radiation within other regions of the spectrum, and/or that is monochromatic, that the modulating means may comprise a beam chopping device, and that the linearizing means may comprise analog circuitry, such as that which is schematically illustrated in FIGS. 3 and 4.

More particularly, those FIGS. show an analog circuit suitable for linearizing the signal from a photoconductive detector, generally designated by the numeral 10, in implementation of the present invention; such a system was used to produce the linearized signal represented by the curve of FIG. 1B, hereinabove discussed. A bias circuit 15 is provided for applying a constant bias voltage to the detector 10, and the system additionally includes an integrated circuit, a voltage follower (reference supply), and a D.C. power supply, generally designated respectively by the numerals 12, 14 and 16. The integrated circuit 12 may suitably be an MPY 600 chip, commercially available from Burr-Brown Research Corporation of Tuscon, Ariz., and the power supply 16 will typically have a 12-volt output.

The voltage follower 14 is utilized to generate a reference voltage ($V_r$), applied through line 34 to terminals 30 and 32 of the chip 12 to accommodate internal voltage limits of the circuitry, as well as being applied to grounding terminals 31 and 33 thereof. The value of the reference voltage will be determined by appropriate setting of the second variable resistor 36, operatively connected to the steady state power supply 16; a ground potential may of course be applied when appropriate, in which case the value for $V_r$ will be zero. Terminals 38 and 40 of chip 12 are joined to output line 42, and the power supply 16 is connected across its terminals 44 and 46.

The detector 10 is directly connected to the chip 12 at terminals 18 and 22, so as to impress its output signal voltage ($V_s$) thereupon through line 20. The reference voltage ($V_r$), plus a fraction of the detector voltage relative to the reference voltage ($f[V_s - V_r]$), is applied to terminal 24 of the chip through line 26, which is connected to line 20 through a variable resistor 28; adjustment of the resistor 28 determines the value of the fractional contant "f."

The functional feature of the chip 12 are schematically illustrated in FIG. 4; its transfer equation is:

$$V_o = A[(X_1 - X_2)(Y_1 - Y_2)/2V + (Z_2 - Z_1)]$$

in which "$V_o$" represents the output voltage from the chip, "A" is its amplification gain, and $X_1$, $X_2$, $Y_1$, $Y_2$, $Z_1$, and $Z_2$ are the voltage applied, respectively, at terminals 24, 32, 22, 30, 40 and 18; division of the product $(X_1 - X_2)(Y_1 - Y_2)$ by 2 volts is an inherent characteristic of the multiplier core 48. Thus, the output voltages from the differential amplifiers 52 and 54, having the values $f(V_s - V_r)$ and $(V_s - V_r)$, respectively, are multiplied in the core 48 of the chip to produce a signal having the value $f(V_2 - V_r)^2$; from that signal is subtracted, in amplifier 50, the signal $(-V_s)$ produced by amplifier 56, yielding as the output signal $V_o$ from the chip 12 a voltage having the value: $V_s + f(V_s - V_r)^2$. As will be appreciated, this satisfies the generalized linearizatioin equation: $X_s + f(X_s - C)^2$ herein set forth, where $V_s$ is $X_s$, is $V_r$ is C, and f equals $f_0$ and incorporates the divisor value of the integrated circuit transfer equation.

The proper value "$f_0$" for the fractional constant "f" may be established in any of a number of ways. For example, a fast Fourier transform of an interferogram signal generated by the detector 10 may be displayed on an oscilloscope or video terminal, graphically calibrated so as to show the energy level of the incident radiation as a function of frequency. In the event that the signal trace shows positive energy values at frequencies lower than the known cutoff frequency of the photoconductive detector (as will commonly occur in an uncorrected signal), the resistance value of the variable resistor 28 in the circuit of FIG. 3 would simply be adjusted until the portion of the transform curve at wavenumbers lower than the cutoff frequency (but higher than the cutoff point of any high-pass filter that may be in the circuit) shows substantially a zero energy level. Assuming of course that the reference voltage ($V_r$) was previously set (by adjustment of the variable resistor 36) so as to accommodate the limitations of the circuit under a practical range of incident radiation intensities, such empirical setting of the value of $f_0$ will effectively linearize the output signal, accurately correlating it to the time-varying intensity of electromagnetic radiation impinging upon the detector.

Alternatively, or in addition to the procedure described, a highly absorbing material may be placed in the path of the instrument beam, so as to produce strong absorption bands in the Fourier transform of the interferogram. In the event that such bands dip below the zero energy level (as will also be typical in a raw detector signal), again the value of the resistor 28 may be adjusted so as to bring the aberrant portions of the curve just to the zero energy level. Having done so, the output voltage signal from the circuit will bear a highly linear relationship to the intensity of radiation impinging upon the photoconductive detector.

Another technique that may be used involves observation of the fast Fourier interferogram transform while the level of external (unmodulated, D.C.) radiation impinging upon the detector is altered. Were a truly linear relationship to exist between the internal (modulated, A.C.) radiation and the detector output signal, there would be no change in the amplitude of the observed trace, irrespective of variations in the level of external energy applied. Consequently, the voltage divider can be adjusted so as to eliminate any such amplitude variations that do appear, to thereby set $f_0$.

In addition to the visual procedures described, it will be appreciated by those skilled in the art the analytical techniques may also be employed to establish the value of the fractional constant. Since that determination involves the elimination, or stabilization, of anomalous energy values, or of a varying proportionality constant (gain), reflected in a transformation curve, the same can be analyzed can be analyzed to assess the indicative data. Once having done so, the analog circuit can automatically or manually be tuned, as necessary to correct the anomalous condition.

Needless to say, such analyses, and automatic adjustments, would most effectively be carried out with the aid of electronic data processing means; the computer of which an FT-IR is comprised will of course offer a very convenient tool for that purpose. Indeed, it will be appreciated by those skilled in the art that the entire linearization procedure can be implemented by a computer method, using a program for processing (for example) an interferogram signal ($I_s$) so as to eliminate therefrom the anomalous features hereinabove discussed. The operative algorithm for doing so is, as noted previously, that in which the raw signal ($I_s$) is divided by a determined fractional constant "$f_0$" (producing a quotient having a value greater than $I_s$), and is summed with the squared value $(I_s)^2$ of the signal (the term "C" of the generalized equation being zero). A proper value for the constant "$f_0$" can be established by application of the criteria described above in regard to the analog linearization circuitry.

It should perhaps be emphasized that the present method and system are applicable to dispersive and monochromatic spectrometers, as well to FT-IR instruments and the like. In such instances, "$f_0$" may be determined using the previously described procedure in which an external source is utilized to create at least two different levels of D.C. energy radiation impinging on the detector, albeit that it may be necessary to chop the internal beam for amplitude modulation, so as to produce the required time-varying energy curve.

It will be appreciated by those skilled in the art that analog circuitry utilized to determine the fractional constant, and/or to implement the corrective algorithm, may vary substantially from that which is illustrated and described herein, without departure from the concepts of the instant invention. The circuitry may of course be incorporated by the manufacturer into a spectrometer or into the preamplifier for a photoconductive detector, or it may be designed and built as an add-on unit. Similarly, the manner in which electronic data processing of the detector signal is effected, so as to implement the linearization algorithm and/or determine the corrective term, will be evident to those skilled in the art, and need not therefore be specifically described; suffice to say that the applicable corrective factor may be determined by a Newton-Raphson technique for iteratively converging upon the proper value.

Thus, it can be seen that the present invention provides a highly effective, and yet incomplex, method and system for correcting electrical signals generated by photoconductive detectors, so as to render detector response substantially linear with respect to the energy of incident radiation. It is believed that the excellent degree of photometric accuracy that is afforded by the instant invention is attributable to an understanding, and innovative utilization and implementation, of the physical principles that underlie photoconductive detector repsonse phenomena, rather than being based upon assumptions and approximations. The method of the invention is facile to utilize, and the apparatus is relatively inexpensive to produce.

Having thus described the invention, what is claimed is:

1. A method for producing a linearized electrical signal that is substantially linearly related to the time-varying intensity of electromagnetic radiation impinging upon a photoconductive detector, comprising the steps:

providing a photoconductive detector for converting incident electromagnetic radiation to generate an electrical signal that is indicative of the energy of the radiation;

applying to said detector a constant bias voltage;

causing electromagnetic radiation to impinge upon said detector for a period of time, so as to generate an electrical signal having a time-varying value $X_s$ that is indicative of the energy of the impinging radiation, the generated signal including electrical distortions which render it nonlinearly related to said impinging radiation energy;

producing a corrective signal having the value $(X_s - C)^2$, wherein C is zero or a numeral constant of like units to $X_s$; and adding at least a fraction of said corrective signal value to a signal having at least the value $X_s$ so as to substantially eliminate said electrical distortions therefrom and thereby produce a substantially linearized output signal.

2. The method of claim 1 wherein said generated and corrective signals are combined in accordance with the relationship:

$$1/a \times [X_s + f(X_s - C)^2],$$

wherein "f" is a fractional constant and "a" has a value selected from the group consisting of unity and "f"; and wherein a specific value "$f_0$" is established for the fractional constant "f," at which specific value said electrical distortions are substantially eliminated in the combined signal produced.

3. The method of claim 2 wherein said generated electrical signal is the A.C. portion of a modulated signal, wherein C is zero, and wherein said value of "a" is equal to "f."

4. The method of claim 2 wherein said generated electrical signal constitutes detector-generated voltages, wherein C is a reference voltage, and wherein said value of "a" is unity.

5. The method of claim 2 wherein said impinging radiation constitutes an interferometer beam; wherein said combined signal is Fourier transformed so as to be produce a transformation signal; and wherein said transformation signal is monitored as the value of "f" is varied so as to determine said specific value of "$f_0$."

6. The method of claim 5 wherein said detector is nonresponsive to radiation at frequencies lower than a certain cutoff frequency value, and wherein such monitoring is carried out by a step selected from the group consisting of:

(a) determining that said transformation signal indicates substantially no energy at said lower frequencies;

(b) determining that said transformation signal indicates substantially no absorbance of said impinging radiation at a level below zero; and (c) varying said impinging radiation to produce at least two different levels of steady state radiation energy, and determining that the amplitude of said transformation signal is free from substantial variation at said different levels of energy produced.

7. The method of claim 2 wherein said combined signal is monitored as the value of "f" and the steady state energy level of said impinging radiation are varied, "$f_0$" being thereby established as a specific value of "f" at which the amplitude of said combined signal is free from substantial variation at the different levels of energy produced.

8. The method of claim 3 wherein said generated signal is converted to digital form, and wherein said steps of producing said corrective signal and combining said signals are carried out by an electronic data processing technique.

9. The method of claim 8 wherein said specific value "$f_0$" is established by an electronic data processing technique.

10. The method of claim 3 wherein said A.C. signal portion is an interferogram.

11. The method of claim 4 wherein said steps of producing said corrective signal and combining said signals are carried out by analog electronic circuitry.

12. The method of claim 11 wherein said specific value "$f_0$," and said reference voltage, are established by such circuitry.

13. The method of claim 1 wherein said impinging electromagnetic radiation is spectral radiation in the infrared region.

14. A system for detecting electromagnetic radiation and producing a linearized electrical output signal that is substantially linearly related to the time-varying intensity of the incident radiation, comprising:

a photoconductive detector for converting incident electromagnetic radiation to generate an electrical signal having a time-varying value $X_s$ that is indicative of the energy of such radiation, said detector having an associated bias circuit for applying a constant bias voltage thereto, and having characteristics that tend to introduce electrical distortions which render the detector-generated signal nonlinearly related to the energy of the impinging radiation;

means for producing a corrective signal having the value $(X_s - C)^2$, wherein C is zero or a numeral constant of like units to $X_s$; and means for adding at least a fraction of such a corrective signal to a signal having at least the value $X_s$, so as to produce such an output signal.

15. The system of claim 14 wherein said means for adding combines the generated and corrective signals in accordance with the relationship:

$$X_s + f(X_s - C)^2,$$

in which "f" is a fractional constant; and wherein said system includes means for establishing a specific value "$f_0$" of said constant "f," at which specific value the electrical distortions are substantially eliminated in the output signal produced.

16. The system of claim 15 wherein said means for producing, said means for adding, and said means for establishing comprise analog electronic circuitry to which said detector is connected for opertion upon the voltage values of the electrical signal generated by said detector, $X_s$ of said relationship representing such voltage values; and wherein means is provided for generating and applying to said circuit a reference voltage, said C term of said relationship being a constant having the value of such reference voltage.

17. The system of claim 16 wherein said means for establishing comprises a variable voltage divider.

18. The system of claim 17 wherein said means for producing and said means for adding comprise and integrated ciurcuit to which said voltage divider is operatively connected.

19. The system of claim 18 wherein said integrated circuit functions in accordance with the transfer equation:

$$V_0 = A\,[(x_1 - x_2)(y_1 - y_2)/B + (z_2 - z_1)],$$

wherein $V_0$ is the output voltage from said integrated circuit, A is its amplification gain, B is a constant-value voltage term, and $X_1, X_2, y_1, y_2, Z_1,$ and $Z_2,$ are variable voltage values.

20. The system of claim 14 wherein the generated electrical signal is the A.C. portion of a modulated signal; wherein said means for adding combines the generated and corrective signals in accordance with the relationship:

$$X_s/f + (X_s)^2,$$

in which $X_s$ is the A.C. signal portion and "f" is a fractional constant; wherein said system includes means for establishing a specific value "$f_0$" of said constant "f," at which specific value the electrical distortions are substantially eliminated in the output signal produced; and wherein said means for producing, said means for adding, and said means for establishing comprise electronic data processing means.

21. The system of claim 14 wherein said detector is a mercury cadmium telluride device.

22. The system of claim 14 wherein said system additionally includes a source of electromagnetic radiation operatively disposed to project a beam upon said detector.

23. The system of claim 22 wherein said system additionally includes interferometer means, operatively disposed in the beam path between said source and said detector.

24. The system of claim 23 wherein said A.C. signal portion is an interferogram.

25. The system of claim 23 wherein said electromagnetic radiation is spectral radiation, and is in the infrared region of the spectrum.

26. The system of claim 25 wherein said system comprises a Fourier transform spectrometer.

27. The system of claim 22 wherein said system additionally includes chopper means, operatively disposed in the beam path between said source and said detector, for modulating the amplitude of a beam projected along said path.

* * * * *

UNITED STATES PATENT AND TRADEMARK OFFICE
CERTIFICATE OF CORRECTION

PATENT NO. : 5,136,154
DATED : August 4, 1992
INVENTOR(S) : Robert M. Carangelo, David G. Hamblen and
Carl R. Brouillette It is certified that error appears in the above-identified patent and that said Letters Patent is hereby corrected as shown below:

Claim 1, column 6, line 28, delete "numeral" and substitute therefor --numerical--.

Claim 5, column 6, line 57, delete "be."

Claim 14, column 7, line 53 delete "numeral" and substitute therefor --numerical--.

Claim 16, column 8, line 6, delete "opertion" and substitute therefore --operation--.

Claim 18, column 8, line 16, delete "and " (second occurrence), and substitute therefor --an--; same claim, line 17 delete "ciurcuit" and substitute therefor --circuit--.

Signed and Sealed this

Thirty-first Day of August, 1993

Attest:

BRUCE LEHMAN

*Attesting Officer*     *Commissioner of Patents and Trademarks*